United States Patent
Huang et al.

[11] Patent Number: 5,927,449
[45] Date of Patent: Jul. 27, 1999

[54] PROPORTIONAL VALVE WITH A VARIABLE PERFORMANCE CURVE

[75] Inventors: Zhen Huang, Wuppertal; Reinhard Hölscher, Salzkotten; Anrc Mono, Köln; Michael Guse, Leverkusen, all of Germany

[73] Assignee: Krupp Bilstein GmbH, Ennepetal, Germany

[21] Appl. No.: 08/964,189

[22] Filed: Nov. 4, 1997

[30] Foreign Application Priority Data

Dec. 4, 1996 [DE] Germany ............................ 196 50 152

[51] Int. Cl.⁶ ....................................................... F16F 9/46
[52] U.S. Cl. .................................. 188/282.2; 188/322.15; 188/322.22
[58] Field of Search .............................. 188/322.15, 317, 188/322.22, 266.2, 266.5, 266.6, 282.2, 282.3, 282.4, 318, 282.7, 319.1; 267/64.15; 701/37, 38, 39; 280/5.513

[56] References Cited

U.S. PATENT DOCUMENTS 5,810,127   9/1998   Schmidt ............................ 188/322.15

Primary Examiner—Douglas C. Butler
Attorney, Agent, or Firm—Max Fogiel

[57] ABSTRACT

A proportional valve for a hydraulic dashpot, with a piston that slides back and forth on the end of a piston rod in a shock-absorbing cylinder. The piston is provided with pressure-sensitive valves for the exchange of fluid during suction and compression states and separates the cylinder into two compartments. Passages are provided for the fluid that applies pressure to the valves to flow through. Space that communicates with whichever compartment it faces and supplies regulating pressure to the particular shock-absorbing valve is provided on the side of the shock-absorbing valve that faces away from the passages. The piston is mounted on a control bolt. The control bolt has two valve seats and two bypass systems. One seat is associated with an electromagnetic spool accommodated in the first bypass system and chokes the fluid flowing through it. The other seat is accommodated in the second bypass system and associated with a tappet that slides back and forth inside the spool and controls the flow of fluid through the second bypass system. The pressurized space on the side of the shock-absorbing valve facing away from the passages communicates through the second bypass system with whatever compartment that happens to face it.

7 Claims, 2 Drawing Sheets

PROPORTIONAL VALVE WITH A VARIABLE PERFORMANCE CURVE

BACKGROUND OF THE INVENTION

The present invention concerns a proportional valve for a hydraulic dashpot with a piston that slides back and forth on the end of a piston rod in a shock-absorbing cylinder. The piston is provided with pressure-sensitive valves for the exchange of fluid during suction and compression states. The piston separates the cylinder into two compartments. Passages are provided for the fluid that applies pressure to the valves to flow through. Space that communicates with whichever compartment it faces and supplies regulating pressure to the particular shock-absorbing valve is provided on the side of the shock-absorbing valve that faces away from the passages.

Known proportional valves operate in accordance with pilot controls. Pressure against the side of the shock-absorbing valve facing away from the passages controls how far the shock-absorbing valve can be lifted by the main stream in a pressurized space there. Countervailing pressure is for this purpose established in the pressurized space with the aid of system of bypasses. The countervailing pressure does not release the main stream, except for any constant currents through the shock-absorbing valve's disk or at the edge of its associated seat, prior to a specified operating state.

German 4 441 047 C2 discloses a proportional valve of this genus wherein the regulating pressure can also be controlled by a spool accommodated in the bypass system. The only performance curve that can be obtained with this valve, however, in spite of its controls, tends to be degressive (a "degressive performance curve" for short hereinafter), and soft roll-off on the part of the vehicle is, to disadvantage, impossible.

German 3 348 176 C2 discloses a proportional valve that is more remote from the present invention. Its shock-absorbing valve disks are subjected to regulating pressure from a pressure-application compartment 40 by way of a support 38. The regulating pressure is applied through a bypass system that can be opened and closed or choked by an extra sliding valve 45.

There are drawbacks to this valve. The pressure-application compartment is entirely inside the piston and has only one side that can be closed by another support. A series of extra bypass bores extending through the piston and a cutout or bore in the shock-absorbing valve disk complicate the manufacturing process without being necessary for unimpeded access on the part of the volumetric portion needed for the controls.

Another drawback is that the aforesaid valve disk 45 combines the function of a shut-off valve with that of a regulating valve. The result is the promotion of discontinuity in the volumetric flow, due for example to flutter on the part of the valve, especially in the event of high-frequency and low-amplitude fluctuations.

SUMMARY OF THE INVENTION

The object of the present invention is accordingly a proportional valve that can be operated and controlled from each side, that provides a proportionally variable degressive shock-absorption performance curve, that allows the establishment of "soft roll-off" at low piston speeds at a proportionally adjustable progressive shock-absorption performance curve, and that is simple and inexpensive to manufacture.

This object is attained in accordance with the present invention as recited in the body of the major claim. Advantageous advanced embodiments are recited in the subsidiary claims.

The piston is accordingly mounted on a control bolt. The control bolt has two valve seats and two bypass systems. One seat is associated with an electromagnetic spool accommodated in the first bypass system and chokes the fluid flowing through it. The other seat is accommodated in the second bypass system and associated with a tappet. The tappet slides back and forth inside the spool and controls the flow of fluid through the second bypass system. The pressurized space on the side of the shock-absorbing valve facing away from the passages communicates through the second bypass system with whatever compartment that happens to face it.

A valve of this design, wherein two bypass systems can be regulated or choked down to complete closure, easily allows the establishment of a performance curve within a field that exhibits simultaneously proportional adjustable progressive and degressive regions between a "soft" and a "hard" setting.

At the hardest performance curve, the first bypass system remains closed with its spool entirely inside the seat. The second bypass system will then allow only pressure-proportional control of the shock-absorbing valves in the suction and compression states, whereby the tappet ensures limitation of the regulating pressure and opens the second bypass system when the fluid pressure in the higher-pressure compartment overcomes the spring tension of the tappet.

A soft performance curve can now be established as desired by the tappet opening the first bypass system.

The spool and/or the tappet can to advantage be forced out of its disengaged position against a spring that dictates its limiting position. This feature simplifies manufacture and makes it possible to adjust the particular bypass system in advance.

The springs that force the spool and the tappet into their limiting positions are to advantage connected in series and have different rates. This feature also simplifies advance adjustment of the overall controls and allows adaptation to different vehicles with different basic hard settings just by inserting springs of specific rates during manufacture.

The tappet in another advantageous embodiment is interposed between the serially connected springs that force the spool and the tappet into their limiting positions and acts as an accommodation and guide for at least one of the springs. The spring that forces the spool into its limiting position in this embodiment rests against the tappet.

This feature simplifies manufacture and assembly. When a soft performance curve is to be established, specifically, a maximal opening can be attained by engaging the spool by way of the existing serial connection with the springs supported in order to lift the tappet as well out of the valve seat or at least relieve it, allowing fluid to flow through both bypass systems. Each spring can be adjusted as hereintofore described to allow still more advantageous advance adjustment.

The tappet in one particular simple embodiment is of non-magnetic material and can accordingly, adjusted in advance by way of the spring, be displaced only due to the pressure of the fluid in the higher-pressure compartment or by a tappet connected via the serial spring connection.

To allow simple and independent control, the tappet in one advantageous embodiment can be engaged by an electromagnet in the control bolt, allowing regulation of the fluid flowing through the second bypass system independent of the pressure in the higher-pressure compartment even when the performance curve is hard.

BRIEF DESCRIPTION OF THE DRAWINGS

One embodiment of the present invention will now be specified with reference to the accompanying drawing, wherein.

DESCRIPTION OF THE PREFERRED EMBODIMENTS

Figure 1:
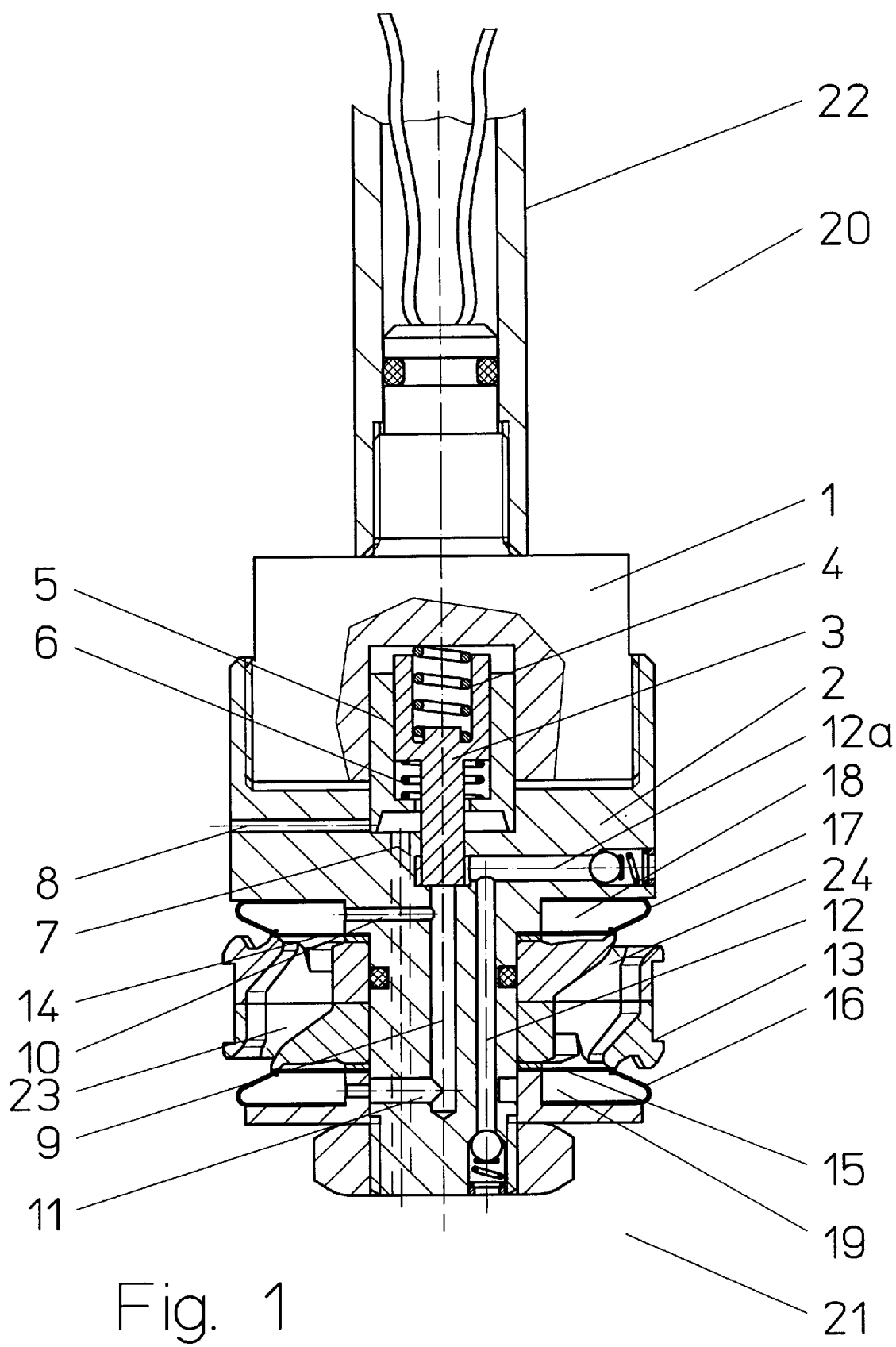
FIG. 1 illustrates a proportional valve in accordance with the present invention mounted on its associated control bolt and connected to the piston rod and FIG. 2 is a larger-scale illustrate of the spool and tappet inside their respective bypass systems.

The proportional magnet 1 illustrated in FIG. 1 is at the center of a control bolt 2 and has a central hollow accommodating both a tappet 3 along with its associated spring 4 and, surrounding the tappet, a spool 5 along with its associated spring 6, which rests against the tappet. It will be evident that the tappet slides back and forth inside the spool. A bypass system essentially comprises bores 7 and 8. Another bypass system comprises control bores 9, 10, and 11 and pressure-relief bores 12 and 12a. The sole purpose of pressure-relief bores 12 and 12a is to limit the level of pressure against the shock-absorbing valves once the tappet is open.

A piston 13 accommodates shock-absorbing valves 14 and 15 and cup-shaped supports 16 and 17 that constitute a pressurized space and provide pressure for controlling the shock-absorbing valves.

Supports 16 and 17 constitute in conjunction with shock-absorbing valves 14 and 15 pressurized spaces 18 and 19 wherein control pressure can be established. Piston 13 divides an unillustrated shock-absorbing cylinder into compartments 20 and 21 and is connected to a piston rod 22 by control bolt 2. Most of the shock-absorbing fluid flows against shock-absorbing valves 14 and 15 through passages 23 and 24.

Figure 2:
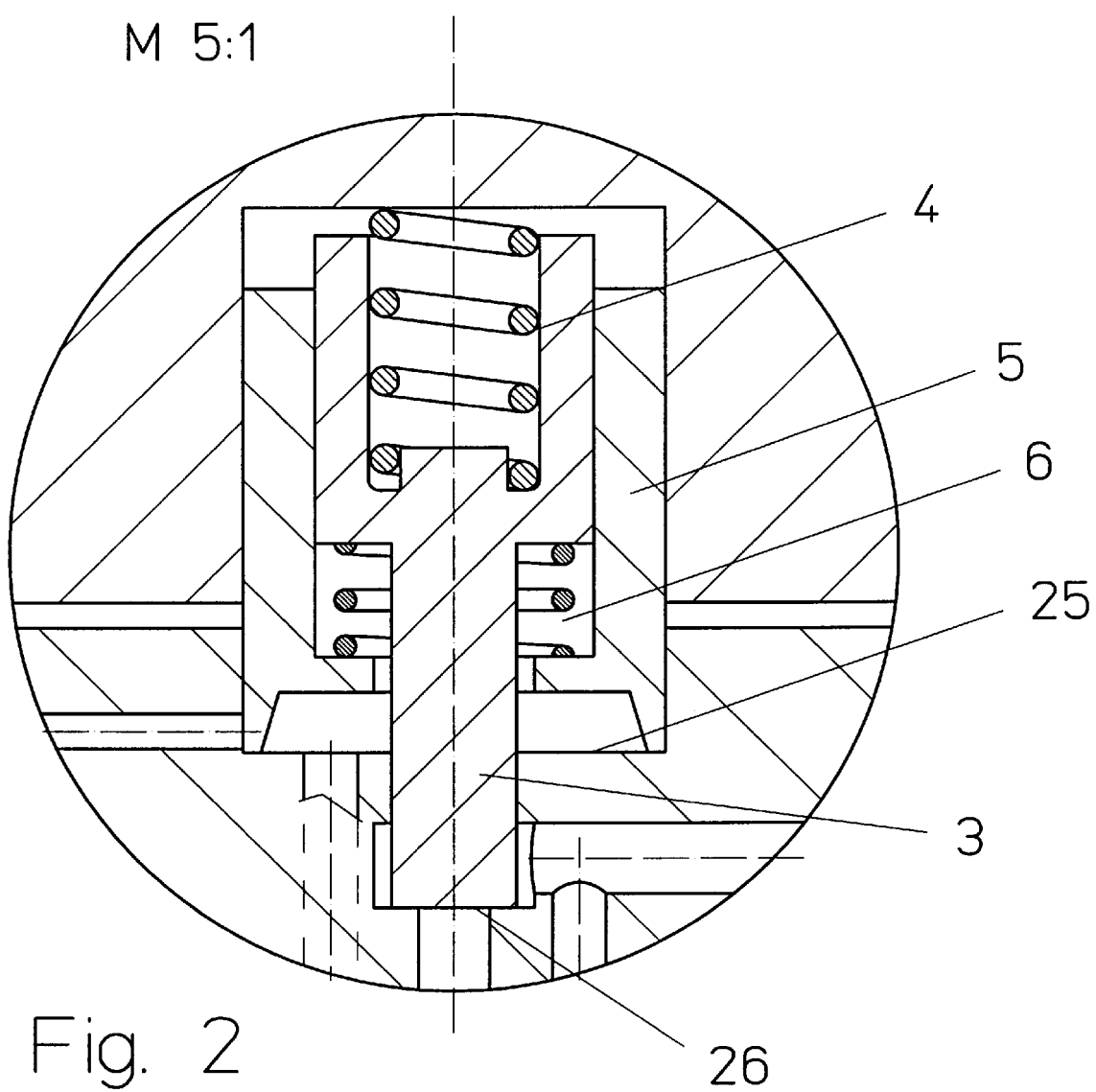

FIG. 2 is a larger-scale illustration showing tappet 3 and spool 5 with their associated springs 4 and 6 along with valve seats 25 and 26 in control bolt 2.

To establish the hardest performance curve, whereby spool 5 is closed and magnet 1 is without power, the bypass bores 7 and 8 in first bypass system are closed. Depending on whether the device is in the suction or pressure state, the fluid can now flow into the second bypass system only over the bent-in edges of cup-shaped supports 16 and 17 and there establish regulating pressure against the particular facing shock-absorbing valves by way of control bores 9, 10, and 11.

If the regulating pressure exceeds a specific level prescribed by the springs, tappet 3 will open and the regulating pressure in the second bypass system can escape into whichever compartment has the lowest pressure through pressure-relief bores 12 and 12a.

To establish the lowest possible performance curve, spool 5 is opened by providing current to the proportional magnet, lifting tappet 3 off seat 26 or at least relieving it. The first bypass system will accordingly allow unimpeded flow through bypass bores 7 and 8. It is also possible, when the pressure in one compartment is high enough, for the hydraulic fluid to flow into the second bypass system over cup-shaped support 16 or 17 and thence directly into the facing compartment by way of pressure-relief bores 12 and 12a.

We claim:

1. A proportional valve for a hydraulic dashpot, comprising: a piston connected to an end of a piston rod; a shock absorbing cylinder, said piston sliding back and forth on said end of said piston rod in said shock absorbing cylinder; pressure-sensitive valves on said piston for exchanging fluid during suction and compression states and dividing said cylinder into two compartments; packages for applying fluid pressure to said valves for fluid to flow through said valves, each of said compartments having a respective pressure-sensitive valve and communicating with a space supplying regulating pressure to said respective pressure-sensitive valve facing away from said passages; a control bolt mounting said piston and having two valve seats and two bypass systems; an electromagnetic spool associated with one of said valve seats and in a first one of said bypass systems and throttling fluid flowing through said first bypass system, the other valve seat being located in the second one of said two bypass systems; a tappet associated with said other valve seat an slidable back and forth inside said spool and controlling flow of fluid through said second bypass system; said space on the side of the pressure-sensitive valve facing away from said passages communicating through said second bypass system with the compartment facing said space; said two valve seats opening and closing said two bypass systems in sequence for controlling said proportional valve according to a specific proportionally variable degressive shock-absorption performance curve having simultaneously proportional adjustable progressive and degressive regions between soft and hard settings.

2. A proportional valve as defined in claim 1, including spring means, said spool and said tappet being movable out of disengaged positions against said spring means, said spring means dictating limiting positions of said spool and said tappet.

3. A proportional valve as defined in claim 2, wherein said spring means comprises two springs for moving respectively said spool and said tappet into said limiting positions, said two springs being connected in series and having different rates.

4. A proportional valve as defined in claim 2, including an electromagnet for engaging said tappet in said control bolt.

5. A proportional valve as defined in claim 1, including spring means, said tappet being movable out of a disengaged position against said spring means, said spring means dictating a limiting position of said tappet.

6. A proportional valve as defined in claim 5, wherein said tappet is of non-magnetic material and is adjustable in advance by said spring means.

7. A proportional valve for a hydraulic dashpot, comprising: a piston connected to an end of a piston rod; a shock absorbing cylinder, said piston sliding back and forth on said end of said piston rod in said shock absorbing cylinder; pressure-sensitive valves on said piston for exchanging fluid during suction and compression states and dividing said cylinder into two compartments; passages for applying fluid pressure to said valves for fluid to flow through said valves, each of said compartments having a respective pressure-sensitive valve and communicating with a space supplying regulating pressure to said respective pressure-sensitive valve facing away from said passages; a control bolt mounting said piston and having two valve seats and two bypass systems; an electromagnetic spool associated with one of said valve seats and in a first one of said bypass systems and throttling fluid flowing through said first bypass system, the other valve seat being located in the second one of said two bypass systems; a tappet associated with said other valve seat and slidable back and forth inside said spool and controlling flow of fluid through said second bypass system; said space on the side of the pressure-sensitive valve facing away from said passages communicating through said second bypass system with the compartment facing said space; spring means, said spool and said tappet being movable out of disengaged positions against said spring means, said spring means dictating limiting positions of said spool and said tappet; said spring means comprising two springs connected in series and having different rates for moving respectively said spool and said tappet into limiting positions, said tappet being located between said serially connected springs and being a guide for at least one of said springs, the respective spring moving said spool into a respective limiting position resting against said tappet.

* * * * *